(12) United States Patent
Watanabe et al.

(10) Patent No.: US 11,888,985 B2
(45) Date of Patent: Jan. 30, 2024

(54) BLOCKCHAIN SYSTEM, REGISTRATION TERMINAL, APPROVAL TERMINAL, SMART CONTRACT REGISTRATION METHOD, AND SMART CONTRACT REGISTRATION PROGRAM

(71) Applicant: Nippon Telegraph and Telephone Corporation, Tokyo (JP)

(72) Inventors: Hiroki Watanabe, Tokyo (JP); Shigenori Ohashi, Tokyo (JP); Shigeru Fujimura, Tokyo (JP); Atsushi Nakadaira, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 142 days.

(21) Appl. No.: 17/045,671

(22) PCT Filed: Apr. 4, 2019

(86) PCT No.: PCT/JP2019/014912
§ 371 (c)(1),
(2) Date: Oct. 6, 2020

(87) PCT Pub. No.: WO2019/194267
PCT Pub. Date: Oct. 10, 2019

(65) Prior Publication Data
US 2021/0160069 A1    May 27, 2021

(30) Foreign Application Priority Data

Apr. 6, 2018  (JP) .................................. 2018-073700

(51) Int. Cl.
*H04L 9/32*       (2006.01)
*G06F 21/64*      (2013.01)

(52) U.S. Cl.
CPC ................ *H04L 9/32* (2013.01); *G06F 21/64* (2013.01)

(58) Field of Classification Search
CPC .................................... H04L 9/32; G06F 21/64
See application file for complete search history.

(56) References Cited

U.S. PATENT DOCUMENTS

2018/0082256 A1    3/2018   Tummuru et al.
2018/0352033 A1*  12/2018   Pacella ................. H04L 9/3239
(Continued)

OTHER PUBLICATIONS

[No Author Listed], "Getting Started with Ethereum Smart Contrats: From Geth Installation to Hello World," Geth, Jan. 8, 2018, retrieved on Oct. 5, 2020, retrieved from URL<https://qiita.com/amachino/items/b59ec8e46863ce2ebd4a>, 10 pages, English Abstract.
(Continued)

*Primary Examiner* — Lynn D Feild
*Assistant Examiner* — Vladimir I Gavrilenko
(74) *Attorney, Agent, or Firm* — Fish & Richardson P.C.

(57) ABSTRACT

The present invention prevents falsification of ABI information and makes it possible for the users to safely read data on a blockchain. A registration terminal 1 includes an extraction unit 142 that extracts from a smart contract, ABI information used to access the smart contract and a transaction issuing unit 13 that issues a transaction including bytecode generated by compiling the smart contract and the ABI information, and an approval terminal 2 includes a verification unit 152 that verifies whether it is possible to access the bytecode included in the transaction by using the ABI information included in the transaction and a block generation unit 154 that, if it is possible to access the bytecode, generates a block including the transaction and makes the block and the ABI information reflected on a distributed ledger 11 of each terminal in the blockchain system.

8 Claims, 7 Drawing Sheets

(56) References Cited

U.S. PATENT DOCUMENTS

| | | | | |
|---|---|---|---|---|
| 2019/0199531 A1* | 6/2019 | Staples | ............... | H04L 9/3213 |
| 2019/0303623 A1* | 10/2019 | Reddy | .................... | G06F 8/71 |
| 2020/0327498 A1* | 10/2020 | Weber | ............... | G06Q 20/3678 |
| 2021/0097795 A1* | 4/2021 | Manchovski | ........ | H04L 63/108 |

OTHER PUBLICATIONS

Abe et al., "Product Information Storage System Using Blockchain in Personal Fabrication Era," Information Processing Society of Japan, 2017, pp. 1045-1054, English Abstract.

CoffeeTimes.Hatenadiary.jp, [Online], "How Ethereum Works," Nov. 2017, retrieved on Apr. 6, 2020, retrieved from URL<https://coffeetimes.hatenadiary.jp/entry/2017/11/07/082426>, 56 pages, English Abstract.

Toyoda et al., "A Novel Blockchaim-Based Product Ownership Management System (POMS) for Anti-Counterfeits in the Post Supply Chain," 2017, 5:17465-77.

Watanabe et al., "Disclosure Control Method Considering Authority Distribution for Structured Data on Blockchain," Proceedings of the 80th National Convention of IPSJ, Mar. 13, 2018, 8 pages (with English Translation).

\* cited by examiner

FIG. 4

SCRIPT CODE (41)

```
function createDeposit(string bc_addr,string bc_from,string bc_to,
address deformed_addr)returns(address, uint){
  if(bytes(bc_addr).length==0 // bytes(bc_from).length==0{
    DepositCreated(msg.sender,0x0,1);
    return (0x0,1);
  }
  Deposit deposit;
  address dep_addr=deposits[bc_addr];
  if(dep_addr !=0x0){
    deposit=Deposit[dep_addr];
  }else{
    deposit=new Deposit();
    deposit.setMultisig(bc_addr);
    deposits[bc_addr]=address(deposit);
  }
  ...
}
```

→ COMPILER (141) →

BYTECODE (42)

```
18630b2d6d75e8f45ab021c7c9f470c8f905
57d9ca160a1cb901cafb9a13fb5da968eea9
c0c4c6448ec6732c4528d2243d5c0935619
955e4be9e5063aac2327def35175ff06606e
e85cb24f07592cd90d26c8a969a252aeff00
01976a9148b5c5ff4eef9431a89a32551e47
ecb1cefbf310988aca80c...
```

ABI INFORMATION (43)

```
[{"constant":false,"inputs":[{"name":"be_multisig_addr",
"type":"string"},{"name":"bc_from","type":"string"},{"nam
e":"bc_to","type":"string"},{"name":"deformed_addr","ty
pe":"address"}],"name":"createDeposit","outputs"[{"na
me":"","type":"address"},{"name":"","type":"uint256"}],
"payable":false,"stateMutability":"nonpayable","type":"fu
nction"},{"constant":true,"inputs"[{"name":"deposit_add
r","type":"address"}],"name":"getOpendBill",...
```

FIG. 6

DESTINATION:
0x8b5d40b1fd4785d80e667b3cd642412bc120cb30
AMOUNT OF PAYMENT・100
BYTECODE OF CONTRACT・
...18630b2d6d75e8f45ab021c7c9f470c8f90557d9ca160a1cb901cafb9a13fb5da968eea9c0c4c6448ec6732c4528d...
ABI INFORMATION:
[{"constant":false,"inputs":[{"name": "bc_multisig_addr","type"・"string"},{"name"・"bc_from","type"・"string"},{"name"・"bc_to","type"・"string"},{"...
SIGNATURE VALUES(v,r,s):
27,0x9908144ca6539e09512b9295c8a27050d478fbb96f8addbc3d075544dc413287,0x1aa528be2b907d316d2da068dd9eb1e23243d97e444d59290d2fddf25269ee0e

FIG. 7

DESTINATION:0x8b...
AMOUNT OF PAYMENT:100
BYTECODE OF CONTRACT:..18630b..
ABI INFORMATION :[{"constant"...
SIGNATURE VALUES:27,0x99..
SCRIPT CODE:
function createDeposit(string be_addr, string bc_from,string bc_to,address deformed_addr)returns(address,uint)
{... } 71

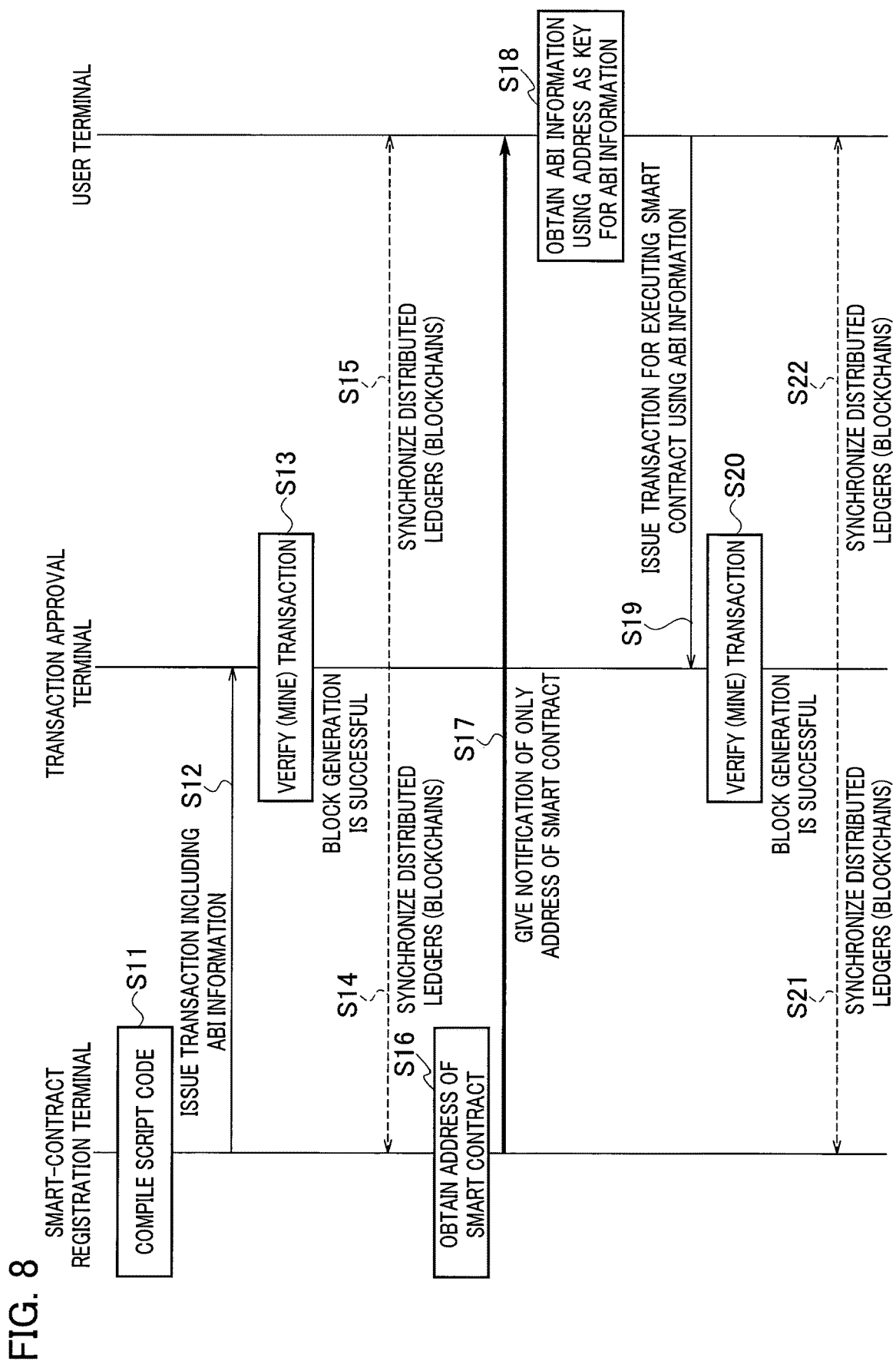

BLOCKCHAIN SYSTEM, REGISTRATION TERMINAL, APPROVAL TERMINAL, SMART CONTRACT REGISTRATION METHOD, AND SMART CONTRACT REGISTRATION PROGRAM

CROSS-REFERENCE TO RELATED APPLICATIONS

This application is a National Stage application under 35 U.S.C. § 371 of International Application No. PCT/JP2019/014912, having an International Filing Date of Apr. 4, 2019, which claims priority to Japanese Application Serial No. 2018-073700, filed on Apr. 6, 2018. The disclosure of the prior application is considered part of the disclosure of this application, and is incorporated in its entirety into this application.

TECHNICAL FIELD

The present invention relates to a technique for registering a smart contract in a blockchain.

BACKGROUND ART

Mechanisms that can ensure the reliability without the need for centralized management are becoming popular, centering on Bitcoin, digital cryptocurrency. In one of these mechanisms called a blockchain, the reliability of communicated information is ensured by a process of consensus building within a distributed network, and the soundness is maintained by preventing frauds, such as falsifications and double-spending, as the entire system.

In the blockchain, information pieces on cryptocurrency transactions between participants (transactions) are put together into a unit called a "block", and blocks are linked in the form of a chain and managed in chronological order. A new block is approved through a consensus algorithm in a distributed network such as Proof of Work. The approval of a new block means that the currency transaction recorded inside the block is consented to in the entire system.

The ledger of a series of these transaction information pieces managed using the blockchain is called a "distributed ledger", and the nodes (terminals) participating in the network have the same distributed ledger. Nowadays, blockchain platform technologies have also been developed in which besides currency transactions, advanced script code is registered in the distributed ledger and in which the execution and results of the script code are also subjected to consensus. For example, in a blockchain platform called Ethereum, script code is executed using a transaction as an input, the execution result is stored in a key-value store having a tree structure (called a world state or a state DB), and a representative value of the store at the time is also recorded in the block in the distributed ledger (non-patent document 1).

In cryptocurrencies, a transaction is limited to a currency transaction record such as "who passed how much to whom". However, in these succeeding blockchain technologies, the user him/herself can programmably set information recorded by using a transaction and script code. Script code that is registered on a blockchain as described above and is registered and executed in a distributed node is called a "smart contract".

Meanwhile, taking advantage of the features of the blockchain technology, high tamper resistance and easy transaction tracing, many attempts have been made to ensure the traceability of information. For example, non-patent document 2 discloses a technique in which a single-board computer that controls a 3D printer is set as a blockchain node, and in which in production, information of the product is stored on the blockchain. In addition, non-patent document 3 describes a system for detecting distribution of counterfeit products by storing data on a blockchain in the supply chain.

PRIOR ART DOCUMENT

Non-Patent Document

Non-patent document 1: "Ethereum ha donoyouni ugoiteirunoka (How Ethereum works)", http://coffee-times.hatenadiary.jp/entry/2017/11/07/082426

Non-patent document 2: Abe Ryosuke, Saito Kenji, Murai Jun, "Product Information Storage System Using Blockchain in Personal Fabrication Era", Multimedia, Distributed, Cooperative, and Mobile (DICOMO2017) Symposium, June 2017

Non-patent document 3: Toyoda, Kentaroh, et al., "A Novel Blockchain-Based Product Ownership Management System (POMS) for Anti-Counterfeits in The Post Supply Chain.", IEEE Access (2017)

SUMMARY OF THE INVENTION

Problem to be Solved by the Invention

As illustrated in non-patent document 2 and non-patent document 3, in order to read data on a blockchain, it is necessary to use a dedicated application to access a smart contract registered on a distributed ledger. This dedicated application includes additional information necessary to read the smart contract. The dedicated application provides the user with a user interface and uses this additional information to accesses information stored on the blockchain.

For example, in Ethereum which is implemented with a blockchain platform, the information stored in the blockchain is bytecode (machine language) in which, for example, character strings are encoded into ASCII and integers are encoded into hexadecimal numbers or the like. For this reason, in order to read and decode stored information, not only the bytecode but also application binary interface (ABI) information is necessary as additional information to know the data structure. In other words, it is difficult for the users to directly read the bytecode stored in the blockchain (reverse engineering), the bytecode can be decoded as meaningful data only by using a dedicated application including the ABI information.

The ABI information is, by nature, information that can be known by only the creator of the smart contract who knows the data structure, and hence a user has no other way but to receive the ABI information from the creator of the smart contract. However, there is a possibility that a malicious creator may tell false ABI information or a possibility that a malicious creator may do a fraudulent act on a dedicated application to be provided for reading ABI information and provide information different from the information stored on the blockchain.

In particular, the problems described above are significant in terms of securing the traceability of information. The users have no means to check whether the traceability result displayed by a dedicated application provided by the creator is really credible (for example, the producers of food materials and shipping routes).

The present invention has been made in light of the above problems, and an objective of the present invention is to provide a technique that prevents falsification of ABI information and enables the users to safely read data on a blockchain.

Means for Solving the Problem

To achieve the above objective, an aspect of the present invention is a blockchain system including: a registration terminal that registers a smart contract; and an approval terminal that approves the smart contract, in which the registration terminal includes an extraction unit that extracts from the smart contract, application binary interface (ABI) information used to access the smart contract and a transaction issuing unit that issues a transaction including bytecode generated by compiling the smart contract and the ABI information, and the approval terminal includes a verification unit that verifies whether it is possible to access the bytecode included in the transaction by using the ABI information included in the transaction and a block generation unit that, if it is possible to access the bytecode, generates a block including the transaction and makes the block and the ABI information reflected on a distributed ledger of each terminal in the blockchain system.

An aspect of the present invention is a registration terminal that registers a smart contract in a blockchain, including: an extraction unit that extracts from the smart contract, application binary interface (ABI) information used to access the smart contract; and a transaction issuing unit that issues a transaction including bytecode generated by compiling the smart contract and the ABI information.

An aspect of the present invention is an approval terminal that approves a transaction in a blockchain system, including: a control unit that receives a transaction including bytecode of a smart contract and application binary interface (ABI) information used to access the smart contract; a verification unit that verifies whether it is possible to access the bytecode included in the transaction by using the ABI information included in the transaction; and a block generation unit that, if it is possible to access the bytecode, generates a block including the transaction and makes the block and the ABI information reflected on a distributed ledger of each terminal in the blockchain system.

An aspect of the present invention is a smart contract registration method of registering a smart contract in a blockchain, including: by means of a registration terminal that registers the smart contract, extracting from the smart contract, application binary interface (ABI) information used to access the smart contract and issuing a transaction including bytecode generated by compiling the smart contract and the ABI information; and by means of an approval terminal that approves the smart contract, verifying whether it is possible to access the bytecode included in the transaction by using the ABI information included in the transaction and generating, if it is possible to access the bytecode, a block including the transaction and making the block and the ABI information reflected on a distributed ledger of each terminal connected to a blockchain network.

An aspect of the present invention is a smart contract registration program that causes a computer to function as the foregoing registration terminal.

An aspect of the present invention is a smart contract registration program that causes a computer to function as foregoing approval terminal.

Effect of the Invention

The present invention provides a technique that prevents falsification of ABI information and enables the users to safely read data on a blockchain.

BRIEF DESCRIPTION OF THE DRAWINGS

FIG. 4 is a diagram illustrating an example of a smart contract.

FIG. 6 is a diagram illustrating an example of a transaction.

FIG. 7 is a diagram illustrating another example of a transaction.

FIG. 8 is a sequence diagram illustrating a process of registering a smart contract.

MODE FOR CARRYING OUT THE INVENTION

Hereinafter, an embodiment of the present invention will be described with reference to the drawings.

Figure 1:
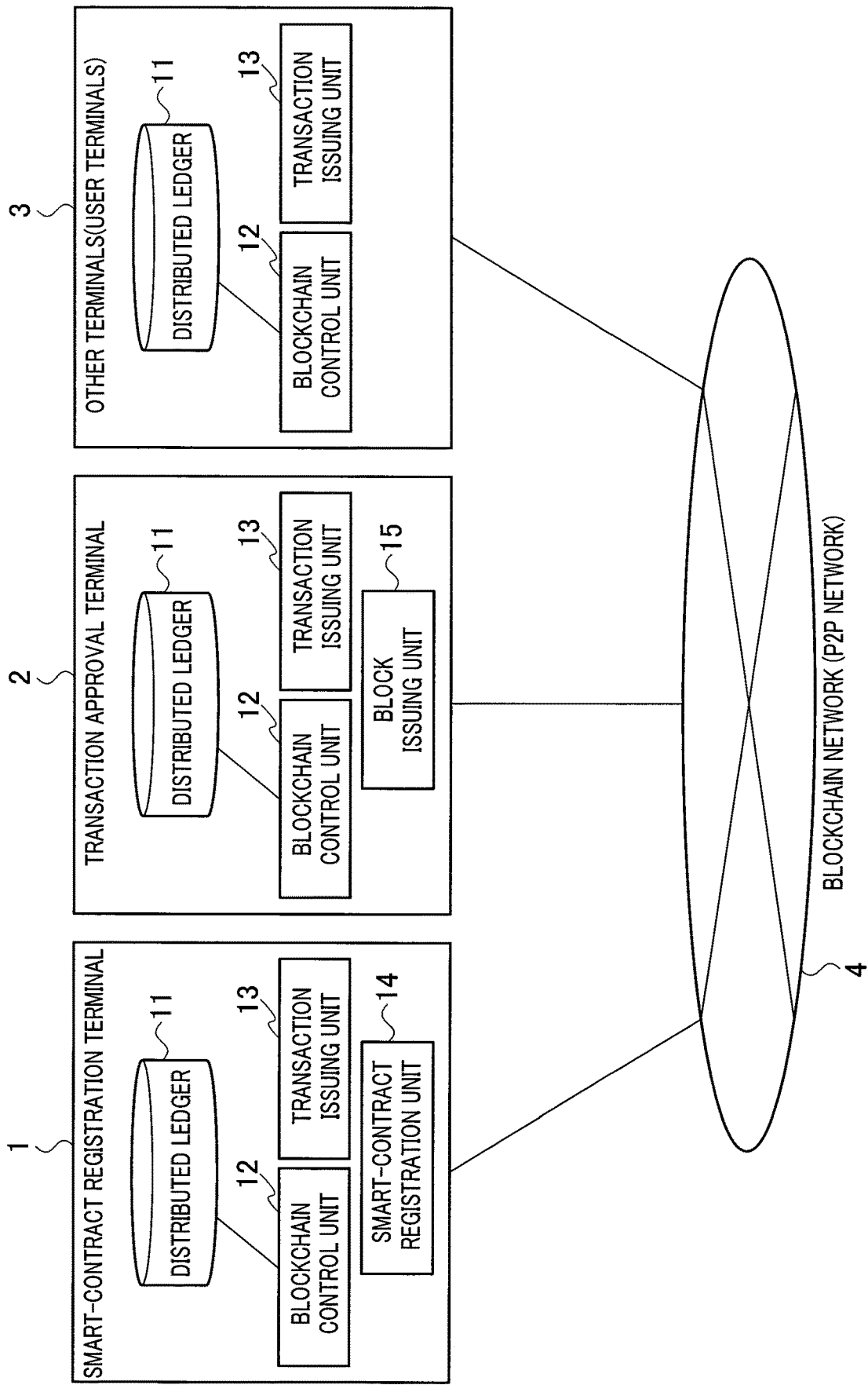
FIG. 1 is a diagram illustrating the overall configuration of a blockchain system according to an embodiment of the present invention.

FIG. 1 is a diagram illustrating the overall configuration of a blockchain system according to the present embodiment. The blockchain according to the present embodiment uses Ethereum which is one of the blockchain platform technologies. Ethereum is an application development platform for using a blockchain as a distributed ledger on which state transitions are recorded.

A blockchain system illustrated in FIG. 1 includes a smart-contract registration terminal 1, a transaction approval terminal 2, and other terminals 3. These terminals 1 to 3 are connected to a blockchain network 4 (hereinafter referred to as a "network") which is a P2P network such that these terminals 1 to 3 work autonomously and decentrally.

The smart-contract registration terminal 1 is a node for a registrant who registers a smart contract in a blockchain. The smart-contract registration terminal 1 compiles the script code of a smart contract, and transfer a transaction including the compile resultant to the network 4.

The smart-contract registration terminal 1 includes a distributed ledger 11, a blockchain control unit 12, a transaction issuing unit 13, and a smart-contract registration unit 14. The distributed ledger 11 is gently synchronized with all the terminals 1 to 3 connected to the network 4 via the blockchain control unit 12, so that the distributed ledger 11 stores the blockchain in the latest state nearly in real time. The distributed ledger in the present embodiment stores a blockchain and a data set managed by the blockchain.

The blockchain control unit 12 works together autonomously and decentrally with the terminals connected to the network 4 to keep the system of the blockchain. The blockchain control unit 12 accesses the distributed ledger 11 to read or update the blockchain and the data set in the distributed ledger 11. The transaction issuing unit 13 issues transactions to the network 4. The smart-contract registration unit 14 issues transactions for registering a smart contract to the distributed ledger 11 (blockchain).

The transaction approval terminal 2, which is a node for a miner, collects transactions transmitted to the network 4, checks the validities, and generates blocks through approval operations. The transaction approval terminal 2 includes a distributed ledger 11, a blockchain control unit 12, a transaction issuing unit 13, and a block issuing unit 15. The distributed ledger 11, the blockchain control unit 12, and the transaction issuing unit 13 of the transaction approval terminal 2 are the same as or similar to the distributed ledger 11, the blockchain control unit 12, and the transaction issuing unit 13 of the smart-contract registration terminal 1.

The block issuing unit 15 verifies transactions issued on the network 4 and tries to generate a block, following a consensus algorithm (agreement algorithm) for generating a block, such as proof of work.

The other terminals 3 are terminals other than the smart-contract registration terminal 1 and the transaction approval terminal 2, and examples of the other terminals 3 include user terminals for users who use the smart contract. A multiple number of the other terminals 3 are connected to the network 4. The other terminals 3 each include the distributed ledger 11, the blockchain control unit 12, and the transaction issuing unit 13 described above and mutually verify data and transactions recorded in the distributed ledger 11 to maintain the system.

Figure 2:
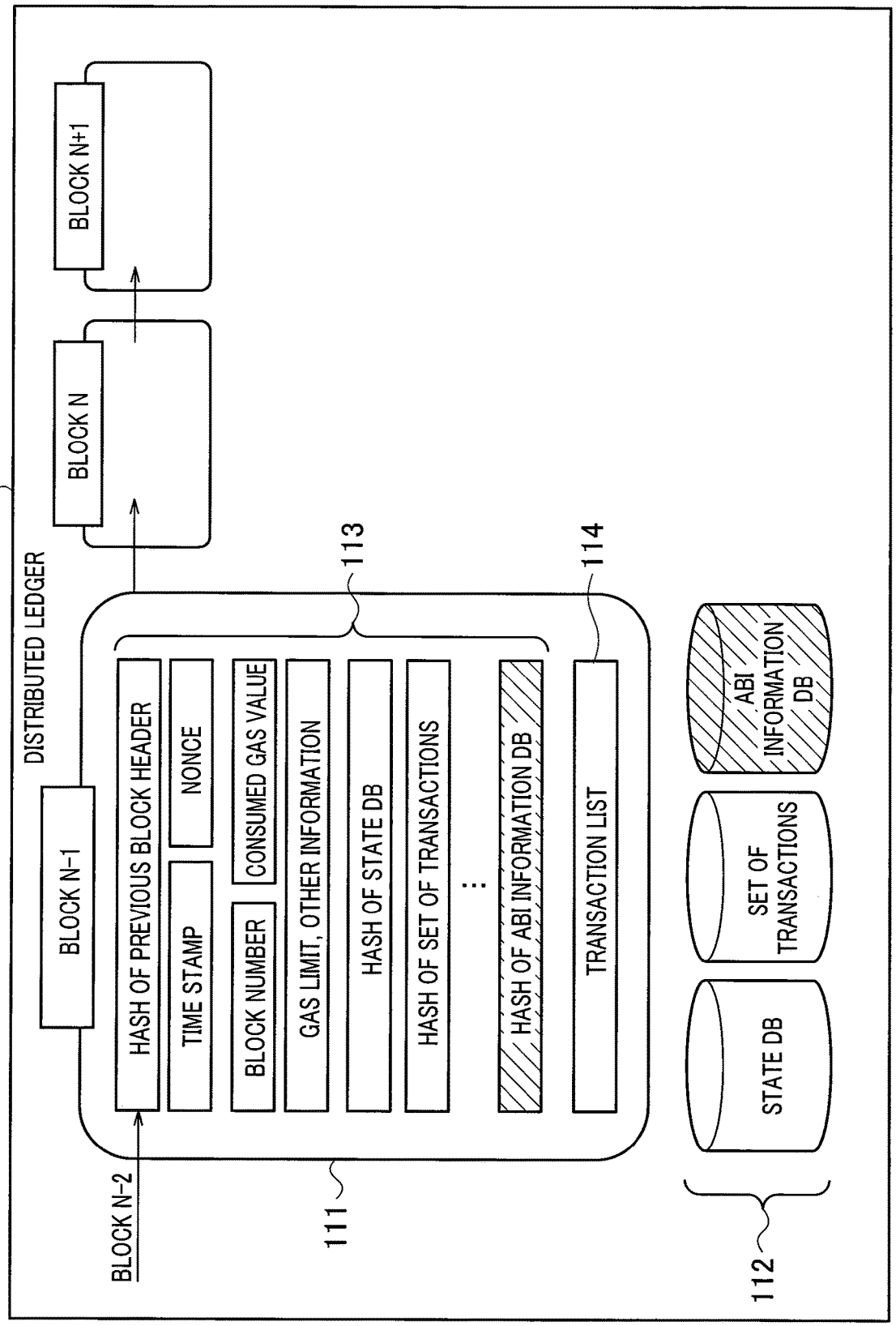
FIG. 2 is a diagram illustrating the configuration of a management ledger.

FIG. 2 illustrates the configuration of the distributed ledger 11 including a blockchain. The distributed ledger 11 in the present embodiment includes a blockchain constituted of multiples blocks 111 and a data set 112 managed by the blockchain.

The block 111 includes a block header 113 and a transaction list 114 and the like. In the block header 113 is set a summary of the entire distributed ledger 11 at the time of the block. In the illustrated example, the summary values of the data set 112 are set in the block header 113 as a snapshot of the data set 112 at a certain time (a hash value of state DB, a hash value of a transaction set, a hash value of ABI information, and the like). For example, in the case where the data set is stored in a tree structure such as a Merkle tree, the root hash of the Merkle tree is set as the summary value. The transaction list 114 is a list of the transactions included in the block 111.

The use and purpose of the data set 112 are not limited to any specific ones. The illustrated distributed ledger 11 includes, for example, a state DB, a transaction set DB, and ABI information as the data set 112.

The state DB is a DB for managing the states of the variables in the smart contract at the time of a certain block. The state DB stores the bytecode of the smart contract. The transaction set DB is a DB indicating a set of transactions at the time of a certain block. A set of transactions means a Merkle tree constituted of all the transactions at the time of a certain block.

In the present embodiment, the data set 112 includes ABI information DB for managing the ABI information of all the smart contracts registered in the state DB. The ABI information DB functions as a key-value store (KVS). When the ABI information DB receives input of identification information uniquely specifying a smart contract (for example, the address of the smart contract), the ABI information DB outputs ABI information used in the smart contract. Application binary interface (ABI) information is additional information for knowing the data structure of the smart contract and includes, for example, the types of variables (data) and functions and the like.

Note that in Ethereum, when the bytecode of a smart contract is registered in the distributed ledger 11 (state DB), identification information indicating the smart contract is given to it. Since a transaction can be sent to an identification information piece in the same way as for remittance of cryptocurrencies, the identification information piece of a smart contract is also called the address. The difference from remittance to the address of a user is that when a transaction is transmitted to the address of a smart contract, the smart contract is executed.

Figure 3:
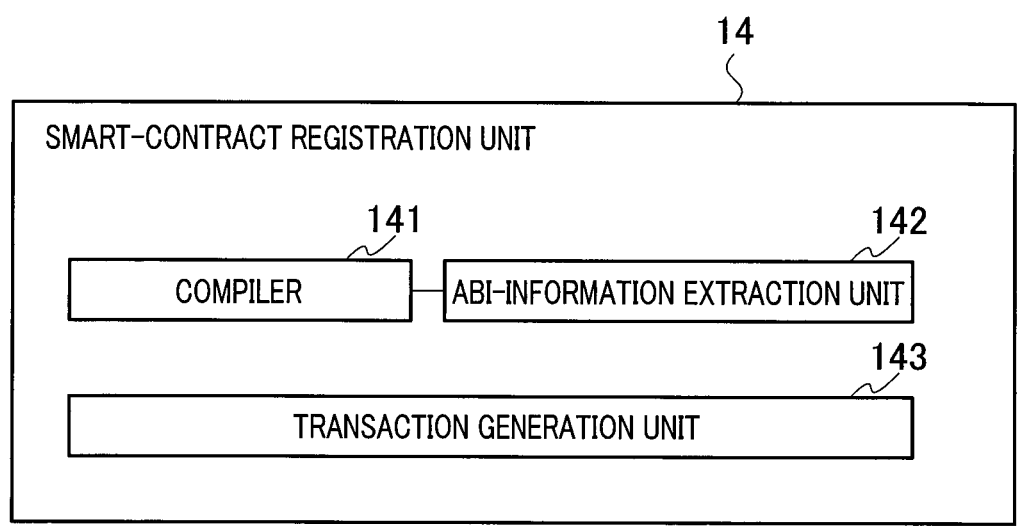
FIG. 3 is a configuration diagram illustrating the configuration of a smart-contract registration unit.

FIG. 3 is a configuration diagram illustrating the configuration of the smart-contract registration unit 14 included in the smart-contract registration terminal 1. The smart-contract registration unit 14 includes a compiler 141, an ABI-information extraction unit 142, and a transaction generation unit 143.

The compiler 141 receives and compiles the script code of a smart contract created by the creator of the smart contract and generates bytecode. In the present embodiment, ABI information for accessing a smart contract converted into bytecode is also included together with the bytecode in a transaction. For this reason, the ABI-information extraction unit 142 analyzes the syntax of the script code inputted to the compiler in parallel with the compilation of the script code, and extracts (generates) ABI information for accessing the bytecode of the smart contract. The transaction generation unit 143 generates a transaction including the bytecode of the smart contract and the ABI information and passes it to the transaction issuing unit 13.

FIG. 4 illustrates an example of the script code 41 of a smart contract before compilation and the bytecode 42 and ABI information 43 of the smart contract after compilation. The script code (source code) is irreversibly compressed when being compiled, and thus the original script code cannot be restored from the bytecode. The users can utilize functions of the bytecode (for example, data update, data reference, and the like), using the ABI information.

Figure 5:
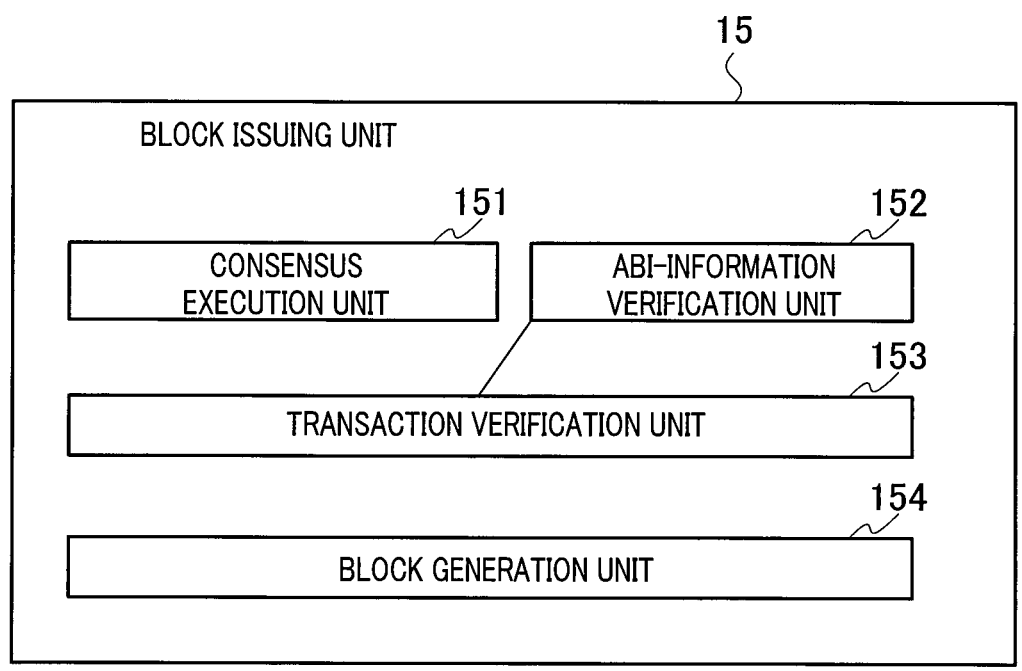
FIG. 5 is a configuration diagram illustrating the configuration of a block issuing unit.

FIG. 5 is a configuration diagram illustrating the configuration of the block issuing unit 15 included in the transaction approval terminal 2. The block issuing unit 15 verifies transactions and tries to generate a block following a consensus algorithm for generating a block, such as proof of work. The illustrated block issuing unit 15 includes a consensus execution unit 151, an ABI-information verification unit 152, a transaction verification unit 153, and a block generation unit 154.

The transaction verification unit 153, when receiving a transaction from the network 4, verifies the transaction in terms of the validity of the electronic signature of the received transaction and the like. In the case where a received transaction includes the bytecode of a smart contract, the transaction verification unit 153 verifies the validity of the bytecode. Specifically, the transaction verification unit 153 verifies whether the bytecode conforms to the specifications of the blockchain protocols. For example, in the case of Ethereum, the transaction verification unit 153 verifies whether the bytecode uses opcode that works in the execution environment called EVM, or whether the capacity does not exceed the one specified in the bytecode, and the like.

At this time, in parallel with the verification process for the bytecode of the smart contract by the transaction verification unit 153, the ABI-information verification unit 152 also verifies the validity of the ABI information included in the same transaction. Namely, the ABI-information verification unit 152 verifies whether the bytecode included in the transaction can be accessed by using the ABI information included in the transaction. Specifically, the ABI-information verification unit 152 uses an interface specification written in the ABI information included in the received transaction to verify whether the ABI information is adapted to the names and types of variables defined in the bytecode included in the transaction so that the bytecode can be accessed.

The block generation unit 154 puts together the transactions issued on the network 4 within a specified time to generate one block. In the present embodiment, if the verification by the transaction verification unit 153 is successful, and if the verification by the ABI-information verification unit 152 is successful, (if the bytecode can be accessed by using the ABI information), the block generation unit 154 generates a block including this transaction and makes the generated block reflected on the distributed ledgers 11 in all the terminals connected to the network 4.

Here, the block generation unit 154 updates every DB in the data set of its own distributed ledger 11 based on the transaction including the bytecode and the ABI information and sets the hash values of the updated DBs in the block header of the generated block. For example, the block generation unit 154 gives an address for uniquely identifying the smart contract to the bytecode of the smart contract included in the transaction. The block generation unit 154 then registers (stores) the address that it gave and the ABI information included in the transaction into the ABI information DB of its own distributed ledger 11 and sets the hash value of the ABI information DB after registration in the block header of the generated block.

The consensus execution unit 151 performs calculation necessary for consensus (agreement) such as hash calculation. For the consensus algorithm, not only proof of work used for Bitcoin but also another consensus algorithm for generating blocks may be used, such as proof of stake in which the amount of coins in possession is used as a resource and PBFT which is an agreement algorithm against Byzantine failures.

The structure of a transaction that the smart-contract registration terminal 1 issues to register a smart contract will be described with reference to FIGS. 6 and 7. FIGS. 6 and 7 are examples of transactions issued by the smart-contract registration terminal 1.

The transaction illustrated in FIG. 6 includes the destination, the amount of payment, and the bytecode of the smart contract and the like as in an ordinary transaction. The transaction of the present embodiment further includes ABI information. The transaction includes the electronic signature (signature values v, r, s) as in an ordinary transaction. In the present embodiment, the sender of a transaction (here, the smart-contract registration terminal 1) adds a signature (electronic signature) to all the data including the ABI information (destination, the amount of payment, bytecode, ABI information).

The transaction illustrated in FIG. 7 further includes script code 71 before compilation (the script code 41 in FIG. 4) corresponding to the bytecode and the ABI information, in addition to the data of the transaction illustrated in FIG. 6. In this case, the script code 71 is not signed. Hence, the signature values in FIG. 6 and the signature values in FIG. 7 are the same.

The script code is used to verify the validity of the correspondence between the bytecode and the ABI information when the transaction approval terminal 2 performs verification. Hence, the transaction of FIG. 7 enables more elaborate verification of the transaction and the ABI information by the transaction verification unit 153 and the ABI-information verification unit 152.

For example, in the case of the transaction of FIG. 6, it is possible that only part of the ABI information corresponding to a smart contract is written and stored instead of all the ABI information (in other words, the smart contract is made public with part of the variables and types of the ABI information hidden). In contrast, in the case of the transaction of FIG. 7, the original script code before compilation is included in the transaction, and thus the transaction approval terminal 2 can verify whether all the variables and types exist correctly, using the complete bytecode and ABI information.

Note that the block generation unit 154 of the transaction approval terminal 2 deletes the script code 71 from the transaction after verification is finished and generates the block. Thus, the script code 71 is not stored in the distributed ledger 11.

FIG. 8 is a sequence illustrating the process from the registration to the use of the smart contract in the present embodiment.

The smart-contract registration terminal 1 (the smart-contract registration unit 14) compiles the script code of a smart contract to generate bytecode, also extracts ABI information from the script code of the smart contract, and generates a transaction including the bytecode and the ABI information (S11). Note that this transaction is a registration transaction for registering the smart contract in the distributed ledger 11.

The smart-contract registration terminal 1 (the transaction issuing unit 13) then issues a transaction including the bytecode and the ABI information (S12). Specifically, the smart-contract registration terminal 1 broadcasts the transaction generated at S11 onto the network 4. This allows the transaction to be propagated to all the terminals connected to the network 4.

The transaction approval terminal 2 (the block issuing unit 15) then verifies (mines) the transaction transmitted at S12 (S13). The transaction approval terminal 2 then puts this transaction together with the other transactions that have occurred within a specified time and generates one block. This block is added to the blockchain of its own distributed ledger 11 through mining of the nonce of this block. When the transaction approval terminal 2 successfully generates the block, the transaction transmitted at S12 gets fixed (approved).

Here, the transaction approval terminal 2 updates every DB in the data set of its own distributed ledger 11 based on the transaction of S12 and sets the hash values of the updated DBs in the block header of the generated block.

For example, the transaction approval terminal 2 calculates an address (identification information) for uniquely identifying the smart contract included in the transaction transmitted at S12 and gives the address to the smart contract (bytecode). The address can be calculated deterministically by anyone by using, for example, the address of the sender that transmitted the transaction including the smart contract. The transaction approval terminal 2 then registers (stores) the address that it gave and the ABI information included in the transaction into the ABI information DB of its own distributed ledger 11 and sets the hash value of the ABI information DB after the registration in the block header of the generated block.

The transaction approval terminal 2 registers the bytecode included in the transaction into the state DB of its own distributed ledger 11 and sets the hash value of the state DB after the registration in the block header of the generated block.

Note that S13 is a process performed by the terminal that succeeded in generating the block earliest among all the terminals connected to the network.

Because of the gentle synchronization between terminals, the block including the transaction transmitted at S12 gets reflected on the distributed ledgers 11 (blockchains) of all the terminals connected to the network (S14, S15). In other words, the blockchain control unit 12 of every terminal adds the block including the transaction of S12 to its own distributed ledger 11. The blockchain control unit 12 of every terminal also updates every DB in the data set of its own distributed ledger 11 based on the transactions included in the block as in the transaction approval terminal 2.

After the smart contract (the bytecode and the ABI information) of the transaction transmitted at S12 is registered in its own distributed ledger 11, the smart-contract registration terminal 1 (the smart-contract registration unit 14) obtains the address of this smart contract (S16). For example, the smart-contract registration terminal 1 calculates the address deterministically in the same or similar way as in the address calculation performed by the transaction approval terminal at S13.

The smart-contract registration terminal 1 (the smart-contract registration unit 14) then notifies the user terminal 3 of the address indicating the storage location of the smart contract or makes the user terminal 3 know the address (S17). The notification timing and notification means of the address to the user terminal 3 may be any timing and any means. For example, the smart-contract registration terminal 1 notifies the address at a specified time by a method such as posting the address on a website or transmitting an email including the address to the user terminal 3. The smart-contract registration terminal 1 may issue a transaction including the address to the network to notify the user terminal 3 of the address, using the blockchain.

Since the distributed ledger 11 of each terminal stores the ABI information in the present embodiment, the smart-contract registration terminal 1 does not need to notify the ABI information together with the address but only needs to notify the address.

The user terminal 3 uses the received address as a key for the ABI information DB in the distributed ledger 11 to make an inquiry to the ABI information DB of its own distributed ledger 11 and obtains the ABI information corresponding to the address (S18). Then, using the obtained ABI information, the user terminal 3 issues a transaction for requesting execution of the smart contract (S19). Specifically, the user terminal 3 issues a transaction for executing a process following the logic described in the smart contract (for example, changing the right holder of a piece of digital content). This transaction includes instruction code or the like generated using the ABI information, for executing a specific logic described in the smart contract.

The transaction approval terminal 2 (the block issuing unit 15) verifies, as in S13, the transaction transmitted at S19 and puts this transaction together with the other transactions that have occurred within a specified time to generate one block (S20).

The transaction approval terminal 2 executes the smart contract specified in this transaction by verifying the transaction transmitted at S19. With this, the transaction approval terminal 2 updates the state DB that manages the values (state) of the smart contract in its own distributed ledger 11 in order to rewrite values of the smart contract managed by the blockchain.

If the generation of the block is successful, the block including this transaction gets reflected on the distributed ledgers 11 (blockchains) of all the terminals connected to the network 4 as in S14 and S15 because of the gentle synchronization between the terminals (S21, S22). Thus, the result of the execution of the smart contract requested by the user terminal 3 gets reflected on the distributed ledgers 11 of all the terminals.

In the present embodiment described above, the smart-contract registration terminal 1 extracts the ABI information for accessing the smart contract from the smart contract and issues a transaction including the bytecode generated by compiling the smart contract and the ABI information. Then, the transaction approval terminal 2 verifies whether the bytecode included in the transaction can be accessed by using the ABI information included in the transaction. If the access is possible, the transaction approval terminal 2 generates a block including the transaction and makes the block and the ABI information reflected on the distributed ledgers 11 of the terminals in the blockchain system.

As described above, in the present embodiment, the ABI information that has been verified by the transaction approval terminal 2 is registered in the distributed ledger 11 of each terminal. Thus, the users of the smart contract can use the bytecode of the smart contract registered in the distributed ledger 11 without using a dedicated application for viewing, provided by the creator (the registrant) of the smart contract.

In the present embodiment, even if a dedicated application by the creator is not delivered, the users of the smart contract can use the smart contract by using the ABI information in the distributed ledger 11 of the user's own terminal.

Thus, the present embodiment prevents a creator of a smart contract from falsifying ABI information and makes it possible for the users to read the data on the blockchain safely. In other words, it is possible to prevent a malicious creator from providing users with a dedicated application including false ABI information and presenting users with information different from information stored on the blockchain. In addition, it is possible for the users to check whether information read from a blockchain using a dedicated application provided from a creator is credible.

The present embodiment also provides better traceability for the users of the smart contract. For a conventional blockchain for the smart contract, it is unknown which variable is of what type and means what, without a dedicated application including ABI information, and hence it is difficult to trace values registered in a blockchain. In contrast, in the present embodiment, since the distributed ledger 11 includes the ABI information, it can be known what each variable means from the type and name of the variable even if a dedicated application is not delivered, and this improves the traceability.

Note that the smart-contract registration terminal 1, the transaction approval terminal 2, and the other terminals 3 described above can be implemented by using, for example, a general-purpose computer system including a central processing unit (CPU) or processor, memory, a storage (HDD: hard disk drive, SSD: solid state drive), a communication device, an input device, and an output device. In this computer system, each function of each apparatus is implemented by the CPU executing a specified program loaded into the memory. For example, the functions of the smart-contract registration terminal 1 are implemented by the CPU of the smart-contract registration terminal 1 executing a program for the smart-contract registration terminal 1; the functions of the transaction approval terminal 2, by the CPU of the transaction approval terminal 2 executing a program for the transaction approval terminal 2; and the functions of the other terminals 3, by the CPUs of the other terminals 3 executing a program for the other terminals 3.

The program for the smart-contract registration terminal 1, the program for the transaction approval terminal 2, and the program for the other terminals 3 may be stored in a computer-readable recording medium, such as a HDD, SSD, USB memory, CD-ROM, DVD-ROM, and MO or may be delivered via a network.

The present invention is not limited to the above embodiment, but various modifications are possible within the scope of the spirit thereof.

For example, the ABI information included in the transaction generated by the smart-contract registration terminal 1 may be information into which the ABI information is converted or may be part of the ABI information, instead of the ABI information itself. As for information into which the ABI information is converted, for example, the ABI information may be compressed to reduce the amount of data, and the compressed ABI information may be included in the transaction. As for part of the ABI information, for example, function portions may be deleted from the ABI information, and the types of variables may be included in the transaction.

EXPLANATION OF THE REFERENCE NUMERALS

1 smart-contract registration terminal
2 transaction approval terminal
3 user terminal
11 distributed ledger
12 blockchain control unit
13 transaction issuing unit
14 smart-contract registration unit
141 compiler
142 ABI-information extraction unit
143 transaction generation unit
15 block issuing unit
151 consensus execution unit
152 ABI-information verification unit
153 transaction verification unit
154 block generation unit

The invention claimed is:

1. A blockchain system comprising:
a registration terminal, including one or more central processing units of a hardware processor, for registering a smart contract; and
an approval terminal, including one or more central processing units of a hardware processor, for approving the smart contract, wherein
the registration terminal is configured to:
compile a script code of the smart contract into a bytecode;
analyze syntax of the script code to extract application binary interface (ABI) information used to access the bytecode of the smart contract, and
issue a transaction including (i) the bytecode generated by compiling the script code of the smart contract, (ii) the extracted ABI information, and (iii) the script code of the smart contract, and
the approval terminal is configured to:
receive the transaction including (i) the bytecode generated by compiling the script code of the smart contract, (ii) the extracted ABI information, and (iii) the script code of the smart contract;
verify a validity of the extracted ABI information included in the transaction by checking a validity of a correspondence between the bytecode and the ABI information included in the transaction, wherein the checking comprises verifying names and types of variables in the extracted ABI information using the bytecode and the extracted ABI information; and
in response to the validity of the extracted ABI information included in the transaction having been verified, remove the script code of the smart contract from the transaction, and generate a block including the transaction and make the block and the ABI information reflected on a distributed ledger of each terminal in the blockchain system.

2. The blockchain system according to claim 1, wherein
the distributed ledger includes an ABI information database that stores the ABI information, and
the approval terminal is configured to register an address of the smart contract and the ABI information into the ABI information database in the approval terminal and set a hash value of the ABI information database after the registration in a header of the block.

3. The blockchain system according to claim 1, wherein
the distributed ledger includes a state database that stores the bytecode, and
the approval terminal is configured to register the bytecode into the state database in the approval terminal and set a hash value of the state database after the registration in a header of the block.

4. An approval terminal for approving a transaction in a blockchain system, comprising one or more central processing units of a hardware processor configured to:
receive a transaction including (i) a script code of a smart contract, (ii) a bytecode generated by compiling the script code of the smart contract, and (iii) application binary interface (ABI) information used to access the smart contract, wherein the ABI information has been generated by analyzing syntax of the script code;
verify a validity of the extracted ABI information included in the transaction by checking a validity of a correspondence between the bytecode and the ABI information included in the transaction, wherein the checking comprises verifying names and types of variables in the extracted ABI information using the bytecode and the extracted ABI information; and
in response to the validity of the extracted ABI information included in the transaction having been verified, remove the script code of the smart contract from the transaction, and generate a block including the transaction and make the block and the ABI information reflected on a distributed ledger of each terminal in the blockchain system.

5. A non-transitory computer readable storage medium storing a smart contract registration program that causes a computer to function as the approval terminal according to claim 4.

6. A computer-implemented method for approving a transaction in a blockchain system, comprising:
receiving a transaction including (i) a script code of a smart contract, (ii) a bytecode generated by compiling the script code of the smart contract, and (iii) application binary interface (ABI) information used to access the smart contract, wherein the ABI information has been generated by analyzing syntax of the script code;
verifying a validity of the extracted ABI information included in the transaction by checking a validity of a correspondence between the bytecode and the ABI information included in the transaction, wherein the checking comprises verifying names and types of variables in the extracted ABI information using the bytecode and the extracted ABI information; and in response to the validity of the extracted ABI information included in the transaction having been verified, removing the script code of the smart contract from the transaction, and generating a block including the transaction and making the block and the ABI information reflected on a distributed ledger of each terminal in the blockchain system.

7. The computer-implemented method according to claim 6, further comprising:

registering an address of the smart contract and the ABI information into an ABI information database and setting a hash value of the ABI information database after the registration in a header of the block.

8. The computer-implemented method according to claim 6, further comprising:

registering the bytecode in a state database included in the distributed ledger and setting a hash value of the state database after the registration in a header of the block.

* * * * *